(12) United States Patent
Anderson et al.

(10) Patent No.: US 7,292,766 B2
(45) Date of Patent: Nov. 6, 2007

(54) USE OF GLASSES CONTAINING RARE EARTH OXIDE, ALUMINA, AND ZIRCONIA AND DOPANT IN OPTICAL WAVEGUIDES

(75) Inventors: Mark T. Anderson, Woodbury, MN (US); Kenton D. Budd, Woodbury, MN (US); Anatoly Z. Rosenflanz, Maplewood, MN (US); Craig R. Schardt, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 182 days.

(21) Appl. No.: 10/425,039

(22) Filed: Apr. 28, 2003

(65) Prior Publication Data

US 2004/0213539 A1 Oct. 28, 2004

(51) Int. Cl.
*G02B 6/00* (2006.01)
(52) U.S. Cl. .................. 385/142; 359/341.5; 501/41
(58) Field of Classification Search ................ 385/142, 385/123–127, 129–132; 501/41, 46, 48, 501/50–52, 78; 359/341.5, 343
See application file for complete search history.

(56) References Cited

U.S. PATENT DOCUMENTS

| | | |
|---|---|---|
| 906,339 A | 12/1908 | Tone |
| 960,712 A | 6/1910 | Saunders |
| 2,206,081 A | 7/1940 | Eberlin |

(Continued)

FOREIGN PATENT DOCUMENTS

| | | |
|---|---|---|
| DE | 2 034 011 | 1/1972 |

(Continued)

OTHER PUBLICATIONS

"A ductile ceramic eutectic composite with high strength at 1,873 K", Waku et al., Nature, vol. 389, Sep. 4, 1997, pp. 49-52.
"A jelly-like ceramic fiber at 1193 K", Waku et al., Mat Res Innovat (2000) 3, pp. 185-189.
"A New Ceramic Eutectic Composite with High Strength at 1873 K", Waku, Adv. Mater., 1998, 10, No. 8, pp. 615-617.
"Aspects of Synthesis of Decorite Opacified Glass", Kondrashov et al., Glass and Ceramics, vol. 58, Nos. 1-2, 2001, pp. 8-11.
"China: Oversupply puts rare earths projects on hold", Industrial Minerals, Aug. 1997.

(Continued)

*Primary Examiner*—Rodney Bovernick
*Assistant Examiner*—Mike Stahl
(74) *Attorney, Agent, or Firm*—Scott A. Bardell; Douglas B. Little

(57) ABSTRACT

The invention provides optical waveguides comprising a glass doped with a rare earth dopant on a surface of the substrate, wherein the glass comprises (a) $Al_2O_3$, at least one of REO or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, based on the total weight of the glass; (b) $Al_2O_3$, at least one of REO or $Y_2O_3$, and at least one of $ZrO_2$ or $HfO_2$, wherein at least 70 percent by weight of the glass collectively comprises the $Al_2O_3$, at least one of REO or $Y_2O_3$, and at least one of $ZrO_2$ or $HfO_2$, and wherein the glass contains not more than 20 percent by weight $SiO_2$ and not more than 20 percent by weight $B_2O_3$, based on the total weight of the glass; or (c) at least 40 percent by weight $Al_2O_3$, based on the total weight of the glass, and a first metal oxide other than $Al_2O_3$, wherein the $Al_2O_3$ and the first metal oxide, collectively comprise at least 80 percent by weight of the glass.

18 Claims, 2 Drawing Sheets

U.S. PATENT DOCUMENTS

| | | | |
|---|---|---|---|
| 2,805,166 A | 9/1957 | Loffler | |
| 3,635,739 A | 1/1972 | MacDowell et al. | |
| 3,650,780 A | 3/1972 | Connelly | |
| 3,714,059 A | 1/1973 | Shaw et al. | |
| 3,717,583 A | 2/1973 | Shaw et al. | |
| 3,754,978 A | 8/1973 | Elmer et al. | |
| 3,940,276 A | 2/1976 | Wilson | |
| 3,947,281 A | 3/1976 | Bacon | |
| 3,973,977 A | 8/1976 | Wilson | |
| 4,111,707 A | 9/1978 | Komorita et al. | |
| 4,182,437 A | 1/1980 | Roberts et al. | |
| 4,415,510 A | 11/1983 | Richmond | |
| 4,472,511 A | 9/1984 | Mennemann et al. | |
| 4,530,909 A * | 7/1985 | Makishima et al. | 501/73 |
| 4,552,199 A | 11/1985 | Onoyama et al. | |
| 4,595,663 A | 6/1986 | Krohn et al. | |
| 4,756,746 A | 7/1988 | Kemp, Jr. et al. | |
| 4,762,677 A | 8/1988 | Dolgin | |
| 4,772,511 A | 9/1988 | Wood et al. | |
| 4,789,501 A | 12/1988 | Day et al. | |
| 4,812,422 A | 3/1989 | Yuhaku et al. | |
| 5,045,402 A | 9/1991 | Adams, Jr. et al. | |
| 5,071,801 A | 12/1991 | Bedard et al. | |
| 5,185,299 A | 2/1993 | Wood et al. | |
| 5,215,563 A | 6/1993 | LaCourse et al. | |
| 5,227,104 A | 7/1993 | Bauer | |
| 5,378,662 A | 1/1995 | Tsuyuki | |
| 5,534,843 A | 7/1996 | Tsunoda et al. | |
| 5,605,870 A | 2/1997 | Strom-Olsen et al. | |
| 5,641,469 A | 6/1997 | Garg et al. | |
| 5,651,925 A | 7/1997 | Ashley et al. | |
| 5,665,127 A | 9/1997 | Moltgen et al. | |
| 5,747,397 A | 5/1998 | McPherson et al. | |
| 5,763,345 A | 6/1998 | Obshima et al. | |
| 5,847,865 A | 12/1998 | Gopinath et al. | |
| 5,902,763 A | 5/1999 | Waku et al. | |
| 5,958,361 A | 9/1999 | Laine et al. | |
| 5,976,274 A | 11/1999 | Inoue et al. | |
| 5,981,415 A | 11/1999 | Waku et al. | |
| 6,245,700 B1 | 6/2001 | Budd et al. | |
| 6,251,813 B1 | 6/2001 | Sato | |
| 6,254,981 B1 | 7/2001 | Castle | |
| 6,268,303 B1 | 7/2001 | Aitken et al. | |
| 6,335,083 B1 | 1/2002 | Kasai et al. | |
| 6,362,119 B1 | 3/2002 | Chiba | |
| 6,451,077 B1 | 9/2002 | Rosenflanz | |
| 6,454,822 B1 | 9/2002 | Rosenflanz | |
| 6,458,731 B1 | 10/2002 | Rosenflanz | |
| 6,461,988 B2 | 10/2002 | Budd et al. | |
| 6,469,825 B1 | 10/2002 | Digonnet et al. | |
| 6,482,758 B1 | 11/2002 | Weber et al. | |
| 6,482,761 B1 | 11/2002 | Watanabe et al. | |
| 6,484,539 B1 | 11/2002 | Nordine et al. | |
| 6,490,081 B1 | 12/2002 | Feillens et al. | |
| 6,511,739 B2 | 1/2003 | Kasai et al. | |
| 6,514,892 B1 | 2/2003 | Kasai et al. | |
| 6,582,488 B1 | 6/2003 | Rosenflanz | |
| 6,696,140 B2 * | 2/2004 | Suzuki | 428/212 |
| 2003/0040423 A1 | 2/2003 | Harada et al. | |
| 2003/0125189 A1 | 7/2003 | Castro et al. | |
| 2003/0126804 A1* | 7/2003 | Rosenflanz et al. | 51/307 |
| 2004/0148966 A1 | 8/2004 | Celikkaya et al. | |
| 2005/0060948 A1 | 3/2005 | Rosenflanz | |
| 2005/0132657 A1 | 6/2005 | Celikkaya et al. | |
| 2005/0132658 A1 | 6/2005 | Celikkaya et al. | |
| 2005/0137076 A1 | 6/2005 | Rosenflanz et al. | |
| 2005/0137077 A1 | 6/2005 | Bange et al. | |
| 2005/0137078 A1 | 6/2005 | Anderson et al. | |

FOREIGN PATENT DOCUMENTS

| | | |
|---|---|---|
| EP | 0 469 271 A1 | 2/1992 |
| EP | 0 601 453 A2 | 6/1994 |
| EP | 0 647 601 A1 | 4/1995 |
| EP | 0 709 347 A1 | 5/1996 |
| EP | 0 722 919 A1 | 7/1996 |
| GB | 1 260 933 | 1/1972 |
| JP | 60-221338 | 11/1985 |
| JP | S 63-156024 | 6/1988 |
| JP | S 63-303821 | 12/1988 |
| JP | 4-119941 | 4/1992 |
| JP | 6-40765 | 2/1994 |
| JP | 11-189926 | 7/1999 |
| JP | 2000-45128 | 2/2000 |
| JP | 2000-45129 | 2/2000 |
| SU | 1455569 | 7/1996 |
| WO | WO 97/25284 | 7/1997 |
| WO | WO 01/16047 A2 | 3/2001 |
| WO | WO 01/27046 A1 | 4/2001 |
| WO | WO 01/56946 A1 | 8/2001 |
| WO | WO 01/56947 A1 | 8/2001 |
| WO | WO 01/56949 A1 | 8/2001 |
| WO | WO 01/56950 A1 | 8/2001 |
| WO | WO 02/08146 A1 | 1/2002 |
| WO | WO 03/011781 A2 | 2/2003 |

OTHER PUBLICATIONS

"China Rare Earth Information", China Rare Earth Information Center, vol. 6, No. 4, Aug. 2000.

"China's Rare Earth Export Quota Set at 45,000 Tons", Dow Jones Interactive Internet Printout on Jun. 20, 2001, http://ptg.djnr.com/ccroot/asp/publib/story.asp, Article 51.

"China's Rare Earth Industry In the Doldrums", Dow Jones Interactive Internet Printout on Jun. 20, 2001, http://ptg.djnr.com/ccroot/asp/publib/story.asp, Article 228.

"Crystallization and thermal properties of $Al_2O_3$-$Y_2O_3$ melts", Stankus et al., ELSEVIER, Journal of Crystal Growth 167 (1996), pp. 165-170.

"Device materials based on Er-, Ho-, Tm-, and Yb-doped rare earth aluminum oxide (REAl™) glass", Weber et al., Containerless Research, Inc. (Believed to be presented at Optoelectronics 2003 Conference, Jan. 30, 2003).

"Divorced eutectic and interface characteristics in a solidified YAG-spinel composite with spinel-rich composition", Wang et al., Journal of Materials Science 35 (2000), pp. 2757-2761.

"Durable 3-5 µm transmitting infrared window materials", Harris, ELSEVIER, Infrared Physics & Technology, 39, 1998, pp. 185-201.

Erbium-Doped Glass Waveguide Devices, Barbier et al., Optical Engineering: Integrated Optical Components, pp. 89-126, 2000.

"Erbium-Doped Optical-Waveguide Amplifiers on Silicon", Kik et al., MRS Bulletin 1998, vol. 23, No. 4, pp. 48-54, April.

"Erbium-doped phosphate glass waveguide on silicon with 4.1 dB/cm gain at 1.535 µm", Yan et al., Appl. Phys. Lett, 71 (20), Nov. 17, 1997, pp. 2922-2924.

"Eutectic Precipitation of the Spinel Solid Solution-Yttrium Aluminum Garnet (YAG) System," Wang et al., J. Am. Ceram. Soc., 81 (1), 1998, pp. 263-265.

"$Gd_3Al_5O_{12}$ Phase Obtained by Crystallization of Amorphous $Gd_2O_3$ ⅝$Al_2O_3$", Shishido et al., Journal of the American Ceramic Society—Discussion and Notes, Jul.-Aug. 1978, pp. 373-375.

"Glass fibres of pure and erbium- or neodymium-doped yttria-alumina compositions", Weber et al., Nature, vol. 393, Jun. 25, 1998, pp. 769-771.

"Glass Formation and Polyamorphism in Rare-Earth Oxide-Aluminum Oxide Compositions", Weber et al., J. Am. Ceram. Soc., 83 [8], 2000, pp. 1868-1872.

"Glass Formation in the Ln-Al-O System (Ln: Lanthanoid and Yttrium Elements)", Chemistry Letters, Chemical Society of Japan, 1973, pp. 1327-1330.

"High-temperature strength and thermal stability of a unidirectionally solidified $Al_2O_3$/YAG eutectic composite", Waku et al., 1998 Chapman & Hall, pp. 1217-1225.

"In Asia", Dow Jones Interactive Internet Printout on Jun. 20, 2001, http://ptg.djnr.com/ccroot/asp/publib/story.asp, Article 139.

"Increase in value of rare-earth products boosts Yixing Xinwei", Yau, South China Morning Post, Apr. 12, 2000.

"Interface modification for increased fracture toughness in reaction-formed yttrium aluminum garnet/alumina eutectic composites," Brewer et al., J. Mater. Res., vol. 14, No. 10, Oct. 1999, pp. 3907-3912.

"Integrated-optic, Lossless-Beamsplitters", Kim et al., Radio Frequency Photonic Devices and Systems, Proceedings of SPIE, vol. 4112, 2000, pp. 101-108.

"Kinetics of nonisothermal sintering of some eutectic oxide compositions, "Volkova et al., 1986 (Abstract from Database Chemabs 'Online! Chemical Abstracts Service, Columbus, Ohio, US).

"Melt-extracted oxide ceramic fibres—the fundamentals", Allahverdi et al., 1996 Chapman & Hall, pp. 1035-1042, Journal of Materials Science 31 (1996).

"Melt extraction processing of structural $Y_2O_3$-$Al_2O_3$ fibers", Aguilar et al., Journal of the European Ceramic Society 20 (2000), pp. 1091-1098.

"Metastable Phase Relationships In The System $Al_2O_3$-$ZrO_2$-$Y_2O_3$", Lakiza et al., Powder Metallurgy and Metal Ceramics, vol. 35, Nos. 11-12, 1996, pp. 621-626.

"Methods Of Investigation Of Properties Of Powder Materials, Interactions in the $Al_2O_3$-$ZrO_2$-$Y_2O_3$ System", Lakiza et al., Powder Metallurgy and Metal Ceramics, vol. 33, Nos. 9-10, 1994, pp. 486-490.

"Microstructure and Thermal Stability of $Al_2O_3$/$Y_3Al_5O_{12}$ (YAG) Eutectic Composite Prepared by an Arc Discharge Method", Isobe et al., Journal of the Ceramic Society of Japan, 109, [1], 2001, pp. 66-70 (Abstract in English).

"Microstructures of laser-treated $Al_2O_3$-$ZrO_2$-$CeO_2$ composites," Chen et al., ELSEVIER, Materials Science and Engineering A196 (1995), pp. 253-260.

"Net optical gain at 1.53 μm in Er-doped $Al_2O_3$ waveguides on silicon", van den Hoven et al., Appl. Phys. Lett. 68 (14), Apr. 1, 1996, pp. 1886-1888.

"Non-stoichiometry and defect structures in rapidly solidified MgO-$Al_2O_3$-$ZrO_2$ ternary eutectics," McKittrick et al., ELSEVIER, Materials Science and Engineering A231 (1997), pp. 90-97.

"Opacified Glass "Decorit" Synthesis Directions", Kondrashov et al., Steklo I Keramika 2001, No. 1, pp. 8-11.

*Phase Diagrams For Ceramists*, Figs. 311, 346, 350, 354-356, 373, and 716, The American Ceramic Society, 1964, pp. 122, 136, 138, 140, 144, 248.

*Phase Diagrams For Ceramists*, 1969 Supplement, Figs. 2340-2344, 2363, 2370, 2374-2375, 2382-2383, 2385, 2387, 2390, and 2392, The American Ceramic Society, 1969, pp. 95-96, 100, 102-103, 105-108.

*Phase Diagrams For Ceramists*, 1975 Supplement, Figs. 4366-4371, 4377-4378, 4404-4405, 4417, 4426, 4430, 4433, 4437, 4440, 4444, 4457, 4572, and 4602, The American Ceramic Society, 1975, pp. 130-132, 135-136, 147, 152, 157, 159-160, 163-164, 166, 172-173, 238, 257.

*Phase Diagrams For Ceramists*, vol. IV, Figs. 5042, 5211, 5217, 5224, 5228, 5232, 5237, 5239, 5241, 5245, 5251, 5257, 5418, and 5437, The American Ceramic Society, 1981, pp. 29, 125, 127, 129-131, 133, 135-137, 139, 141, 143, 220, 228.

*Phase Diagrams For Ceramists*, vol. VI, Fig. 6464, The American Ceramic Society, 1981, p. 162.

"Phase Equilibria in the Yttrium Oxide-Alumina System", Toropov et al., Bulletin of the Academy of Sciences, USSR, Division of Chemical Science, No. 7, Jul. 1964, pp. 1076-1081, A translation of Seriya Khimicheskaya.

*Phase Equilibria Diagrams, Phase Diagrams For Ceramists*, vol. XI, Oxides, Figs. 9261-9264, The American Ceramic Society, 1995, pp. 105-106.

"Phase identification of $Al_2O_3$/$RE_3Al_5O_{12}$ and $Al_2O_3$/$REAlO_3$ (RE = Sm-Lu, Y) eutectics", Yoshikawa et al., ELSEVIER, Journal of Crystal Growth 218 (2000), pp. 67-73.

"Powder-Material Research Methods And Properties, Polythermal Sections Of The $Al_2O_3$-$ZrO_2$-$Y_2O_3$ Phase Diagram", Lakiza et al., Powder Metallurgy and Metal Ceramics, vol. 34, Nos. 11-12, 1995, pp. 655-659.

"Preliminary data on subsolidus phase equilibria in the $La_2O_3$-$Al_2O_3$-$Mn_2O_3$ and $La_2O_3$-$Al_2O_3$-$Fe_2O_3$ systems", Hrovat et al., Journal of Materials Science Letters 14 (1995), pp. 265-267.

"Prices", Asian Ceramics and Glass, Jan. 2001.

"Processing and crystallization of rapidly solidified $Al_2O_3$-$Y_2O_3$ fibres", Aguilar et al., British Ceramic Transactions, 2000, vol. 99, No. 6, pp. 256-259.

"Processing, Microstructure, and Strength of Alumina-YAG Eutectic Polycrystals", Mah et al., J. Am. Ceram. Soc., 83 [8], 2000, pp. 2088-2090.

"Production and Studies of Alumina Based Refractory Glass", Coutures et al., Mat. Res. Bull., vol. 10, No. 6, pp. 539-545 (1975).

"Rapid Quenching on the Binary Systems of High Temperature Oxides", Suzuki et al., Mat. Res. Bull., vol. 9, 1974, pp. 745-754.

"Rapid Solidification of Ceramics, A Technology Assessment", Brockway et al., Metals and Ceramics Information Center, MCIC Report, Jan. 1984, MCIC 84-49.

"Rare Earth—Market Confusion Inevitable Due to China's Unstable Supply", Japan Chemical Week, vol. 41, No. 2080, Jul. 6, 2000, pp. 6-7.

"Rare-Earth Metals", Hedrick, 1997, pp. 61.1-61.6.

"Rare earth oxide-aluminum oxide glasses for mid-range IR devices", Weber et al., Containerless Research, Inc. (Believed to be presented at Bios 2003 Conference, Jan. 26, 2003).

"Synthesis of Y-Al Garnet", Krokhin et al., Glass and Ceramics, vol. 55, Nos. 5-6, 1998, pp. 151-152.

"Solidus Surface And Phase Equilibria During The Solidification Of Alloys In The $Al_2O_3$-$ZrO_2$-$Y_2O_3$ System", Lakiza et al., Powder Metallurgy and Metal Ceramics; vol. 34, Nos. 1-2, 1995, pp. 64-67.

"The Liquidus Surface In The $Al_2O_3$-$ZrO_2$-$Y_2O_3$ Phase Diagram", Lakiza et al., Powder Metallurgy and Metal Ceramics, vol. 33, Nos. 11-12, 1994, pp. 595-597.

"Thermo-Mechanical Stability Of Directionally Solidified $Al_2O_3$-$ZrO_2(Y_2O_3)$ Eutectic Fibers", Yang et al., Scripta Materialia, vol. 36, No. 9, 1997, ppp. 961-965.

"Towards rare-earth clustering control in doped glasses", Auzel et al., ELSEVIER, Optical Materials 16 (2001), pp. 93-103.

"Unusual Glass Formation in the Al-Nd-O System", Chemistry Letters, 1973, pp. 741-742.

U.S. Appl. No. 09/620,262, filed Jul. 19, 2000, Fused $Al_2O_3$-$Y_2O_3$ Eutectic Abrasive Particles, Abrasive Articles, And Methods Of Making And Using The Same.

U.S. Appl. No. 09/704,843, filed Nov. 2, 2000, Fused-$Al_2O_3$-MgO-$Y_2O_3$ Eutectic Abrasive Particles, Abrasive Articles, And Methods Of Making And Using The Same.

U.S. Appl. No. 09/618,879, filed Jul. 19, 2000, Fused $Al_2O_3$ Rare Earth Oxide Eutectic Abrasive Particles, Abrasive Articles, And Methods Of Making And Using The Same.

U.S. Appl. No. 09/772,730, filed Jan. 30, 2001, Fused $Al_2O_3$-MgO-Rare Earth Oxide Eutectic Abrasive Particles, Abrasive Articles, And Methods Of Making And Using The Same.

U.S. Appl. No. 09/619,191, filed Jul. 19, 2000, Fused Abrasive Particles, Abrasive Articles, And Methods Of Making And Using The Same.

U.S. Appl. No. 09/619,289, filed Jul. 19, 2000, Fused Aluminum Oxycarbide/Nitride- $Al_2O_3$ Rare Earth Oxide Eutectic Abrasive Particles, Abrasive Articles, And Methods Of Making And Using The Same.

U.S. Appl. No. 09/619,106, filed Jul. 19, 2000, Fused Aluminum Oxycarbide/Nitride-$Al_2O_3$ Rare Earth Oxide Eutectic Materials.

U.S. Appl. No. 09/618,876, filed Jul. 19, 2000, Fused $Al_2O_3$-$Y_2O_3$-$ZrO_2$ Eutectic Abrasive Particles, Abrasive Articles, And Methods Of Making And Using The Same.

U.S. Appl. No. 09/619,192, filed Jul. 19, 2000, Fused $Al_2O_3$-Rare Earth Oxide-$ZrO_2$ Eutectic Materials.

U.S. Appl. No. 09/619,744, filed Jul. 19, 2000, Fused $Al_2O_3$-Rare Earth Oxide-$ZrO_2$ Eutectic Abrasive Particles, Abrasive Articles, And Methods Of Making And Using The Same.

U.S. Appl. No. 10/211,597, filed Aug. 2, 2002, $Al_2O_3$-Rare Earth Oxide-$ZrO_2$/$HfO_2$ Materials, and Methods of Making and Using the Same.

U.S. Appl. No. 10/211,638, filed Aug. 2, 2002, $Al_2O_3$-$Y_2O_3$-$ZrO_2$/$HfO_2$ Materials, and Methods of Making and Using the Same.

U.S. Appl. No. 10/211,629, filed Aug. 2, 2002, Abrasive Particles, and Methods of Making and Using the Same.

U.S. Appl. No. 10/211,598, filed Aug. 2, 2002, Abrasive Particles, Abrasive Articles, and Methods of Making and Using the Same.

U.S. Appl. No. 10/211,630, filed Aug. 2, 2002, Abrasive Particles, and Methods of Making and Using the Same.

U.S. Appl. No. 10/211,639, filed Aug. 2, 2002, Method for Making Amorphous Materials and Ceramics.

U.S. Appl. No. 10/211,034, filed Aug. 2, 2002, Ceramic Materials, Abrasive Particles, Abrasive Articles, and Methods of Making and Using the Same.

U.S. Appl. No. 10/211,044, filed Aug. 2, 2002, Glass-Ceramics.

U.S. Appl. No. 10/211,628, filed Aug. 2, 2002, Alumina-Zirconia, and Methods of Making and Using the Same.

U.S. Appl. No. 10/211,491, filed Aug. 2, 2002, Method of Making Ceramic Articles.

U.S. Appl. No. 10/211,640, filed Aug. 2, 2002, Plasma Spraying.

U.S. Appl. No. 10/211,684, filed Aug. 2, 2002, Method of Making Amorphous and Ceramics via Melt Spinning.

U.S. Appl. No. 10/358,772, filed Feb. 5, 2003, Methods of Making Ceramic Particles.

U.S. Appl. No. 10/358,765, filed Feb. 5, 2003, Methods of Making Ceramics.

U.S. Appl. No. 10/358,910, filed Feb. 5, 2003, Ceramics and Methods of Making the Same.

U.S. Appl. No. 10/358,856, filed Feb. 5, 2003, Use of Ceramics in Dental and Orthodontic Applications.

U.S. Appl. No. 10/358,855, filed Feb. 5, 2003, $Al_2O_3$-$La_2O_3$-$Y_2O_3$-MgO Ceramics, And Methods Of Making The Same.

U.S. Appl. No. 10/358,708, filed Feb. 5, 2003, Methods of Making $Al_2O_3$-$SiO_2$ Ceramics.

* cited by examiner

USE OF GLASSES CONTAINING RARE EARTH OXIDE, ALUMINA, AND ZIRCONIA AND DOPANT IN OPTICAL WAVEGUIDES

BACKGROUND

The invention relates to the use of glasses containing rare earth oxides and aluminum oxide in optical waveguides.

Optical waveguides are known in the art and are used to carry optical signals along a desired path. Waveguides may be planar in shape or in the form of a fiber. These optical waveguides typically have either a thin film of material deposited upon a substrate or a core material surrounded by cladding. The material has shape and optical characteristics to form a waveguide path for the optical signals. Some types of optical waveguides may also provide amplification to the optical signals inputted into the waveguide. In general, waveguide amplifiers are pumped with an external coherent light source, that is, a laser, to cause electrons to enter higher energy bands. Once in a higher energy band, the transition to a lower energy band is such that the optical signals passing through the waveguide is amplified.

Production of small, high power density devices requires materials that dissolve large amounts of dopant in a homogeneous medium. Clustering of dopant ions restricts the use of silica-based glasses to applications where low dopant concentrations can be used, that is, relatively large devices. The ongoing desire for compact devices for optical signal processing, optical signal amplification, and high power density laser applications has prompted the development of new optical waveguide materials that can support larger concentrations of dopants than the glasses used currently.

SUMMARY

In one aspect, the invention provides an optical waveguide. The optical wave guide comprises a substrate and a rare earth doped glass on the substrate, wherein the glass comprises (a) $Al_2O_3$, at least one of REO or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, based on the total weight of the glass; (b) $Al_2O_3$, at least one of REO or $Y_2O_3$, and at least one of $ZrO_2$ or $HfO_2$, wherein at least 70 percent by weight of the glass collectively comprises the $Al_2O_3$, at least one of REO or $Y_2O_3$, and at least one of $ZrO_2$ or $HfO_2$, and wherein the glass contains not more than 20 percent by weight $SiO_2$ and not more than 20 percent by weight $B_2O_3$, based on the total weight of the glass; or (c) at least 40 percent by weight $Al_2O_3$, based on the total weight of the glass, and a first metal oxide other than $Al_2O_3$, wherein the $Al_2O_3$ and the first metal oxide, collectively comprise at least 80 percent by weight of the glass.

In another aspect, the invention provides an optical waveguide comprising a glass fiber having a core material and a cladding surrounding the core material, wherein the core material comprises a glass doped with a rare earth dopant, wherein the glass comprises (a) $Al_2O_3$, at least one of REO or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, based on the total weight of the glass; (b) $Al_2O_3$, at least one of REO or $Y_2O_3$, and at least one of $ZrO_2$ or $HfO_2$, wherein at least 70 percent by weight of the glass collectively comprises the $Al_2O_3$, at least one of REO or $Y_2O_3$, and at least one of $ZrO_2$ or $HfO_2$, and wherein the glass contains not more than 20 percent by weight $SiO_2$ and not more than 20 percent by weight $B_2O_3$, based on the total weight of the glass; or (c) at least 40 percent by weight $Al_2O_3$, based on the total weight of the glass, and a first metal oxide other than $Al_2O_3$, wherein the $Al_2O_3$ and the first metal oxide, collectively comprise at least 80 percent by weight of the glass.

In another aspect, the invention provides an optical amplifier comprising an optical pump source which provides optical pump light and an optical waveguide coupled to receive said optical pump light from the optical pump source, wherein said optical waveguide comprises a glass doped with a rare earth dopant, wherein the glass comprises (a) $Al_2O_3$, at least one of REO or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, based on the total weight of the glass; (b) $Al_2O_3$, at least one of REO or $Y_2O_3$, and at least one of $ZrO_2$ or $HfO_2$, wherein at least 70 percent by weight of the glass collectively comprises the $Al_2O_3$, at least one of REO or $Y_2O_3$, and at least one of $ZrO_2$ or $HfO_2$, and wherein the glass contains not more than 20 percent by weight $SiO_2$ and not more than 20 percent by weight $B_2O_3$, based on the total weight of the glass; or (c) at least 40 percent by weight $Al_2O_3$, based on the total weight of the glass, and a first metal oxide other than $Al_2O_3$, wherein the $Al_2O_3$ and the first metal oxide, collectively comprise at least 80 percent by weight of the glass.

In another aspect, the invention provides a glass useful in optical waveguides comprising a glass doped with a rare earth dopant wherein the glass comprises (a) $Al_2O_3$, at least one of REO or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, based on the total weight of the glass; (b) $Al_2O_3$, at least one of REO or $Y_2O_3$, and at least one of $ZrO_2$ or $HfO_2$, wherein at least 70 percent by weight of the glass collectively comprises the $Al_2O_3$, at least one of REO or $Y_2O_3$, and at least one of $ZrO_2$ or $HfO_2$, and wherein the glass contains not more than 20 percent by weight $SiO_2$ and not more than 20 percent by weight $B_2O_3$, based on the total weight of the glass; or (c) at least 40 percent by weight $Al_2O_3$, based on the total weight of the glass, and a first metal oxide other than $Al_2O_3$, wherein the $Al_2O_3$ and the first metal oxide, collectively comprise at least 80 percent by weight of the glass.

In another aspect, the invention provides a method for amplifying optical signals comprising the steps of (1) inputting the optical signals to an optical waveguide comprising a glass doped with a rare earth dopant, wherein the glass comprises (a) $Al_2O_3$, at least one of REO or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, based on the total weight of the glass; (b) $Al_2O_3$, at least one of REO or $Y_2O_3$, and at least one of $ZrO_2$ or $HfO_2$, wherein at least 70 percent by weight of the glass collectively comprises the $Al_2O_3$, at least one of REO or $Y_2O_3$, and at least one of $ZrO_2$ or $HfO_2$, and wherein the glass contains not more than 20 percent by weight $SiO_2$ and not more than 20 percent by weight $B_2O_3$, based on the total weight of the glass; or (c) at least 40 percent by weight $Al_2O_3$, based on the total weight of the glass, and a first metal oxide other than $Al_2O_3$, wherein the $Al_2O_3$ and the first metal oxide, collectively comprise at least 80 percent by weight of the glass; and (2) applying pump light to said optical waveguide to cause said waveguide to provide optical gain to the optical input signals.

DETAILED DESCRIPTION

"rare earth dopant" refers to a dopant that provides light emission in response to excitation of its electrons and is a different material than REO. Rare earth dopants include those containing cerium, praseodymium, neodymium, promethium, samarium, europium, gadolinium, terbium, dysprosium, holmium, erbium, thulium, ytterbium, or their other compounds, and mixtures thereof;

"glass" refers to amorphous material exhibiting a glass transition temperature;

"rare earth oxides" refers to cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium oxide (e.g., $Gd_2O_3$), holmium oxide (e.g., $Ho_2O_3$), lanthanum oxide (e.g., $La_2O_3$), lutetium oxide (e.g., $Lu_2O_3$), neodymium oxide (e.g., $Nd_2O_3$), praseodymium oxide (e.g., $Pr_6O_{11}$), samarium oxide (e.g., $Sm_2O_3$), terbium oxide (e.g., $Tb_2O_3$), thorium oxide (e.g., $Th_4O_7$), thulium oxide (e.g., $Tm_2O_3$), and ytterbium oxide (e.g., $Yb2O_3$), and combinations thereof; and "REO" refers to rare earth oxide(s);

"$T_g$" refers to the glass transition temperature as determined by differential thermal analysis;

Wave Guide and Amplifier

Figure 1:
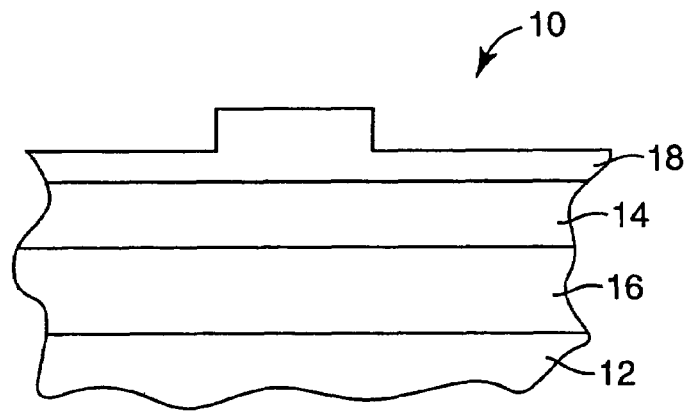
FIG. 1 is a cross-sectional illustration of one embodiment of an optical waveguide described herein.

FIG. 1 is a cross-sectional view of an optical waveguide 10 in accordance with one embodiment of the invention. Optical waveguide 10 is shown deposited on a silicon substrate 12 and includes rare earth doped layer 14. Rare earth doped layer 14 is sandwiched between two cladding layers, a lower low refraction index layer 16 and an upper low refraction index layer 18. The optical waveguide in FIG. 1 is meant to be for illustrative purposes only. The glasses described herein may be used in any waveguide configuration that utilizes doped-materials.

Figure 2:
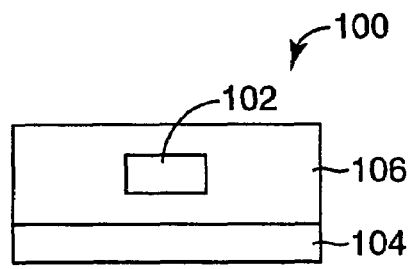
FIG. 2 is a cross-sectional illustration of another embodiment of an optical waveguide described herein.
Figure 3:
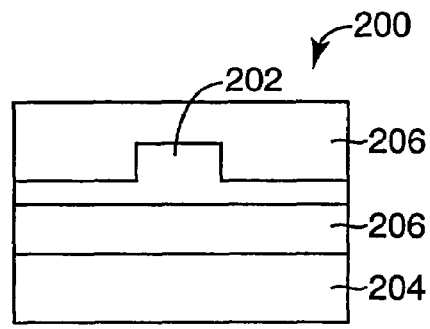
FIG. 3 is a cross-sectional illustration of another embodiment of an optical waveguide described herein.
Figure 4:
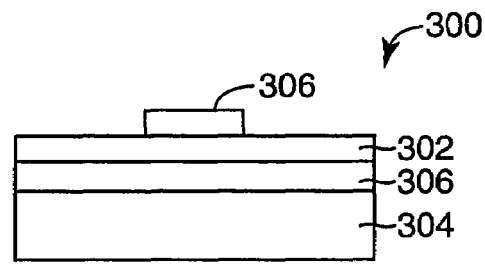
FIG. 4 is a cross-sectional illustration of another embodiment of an optical waveguide described herein.
Figure 5:
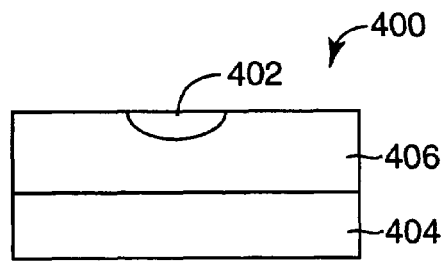
FIG. 5 is a cross-sectional illustration of another embodiment of an optical waveguide described herein.
Figure 6:
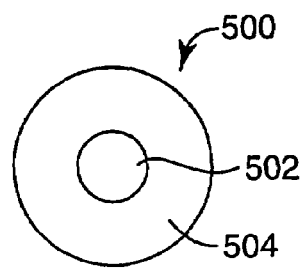
FIG. 6 is a cross-sectional illustration of another embodiment of an optical waveguide described herein.

Optical waveguides of the invention may also include configurations known as "channel" waveguides, "ridge" waveguides, "strip-loaded" waveguides, and "diffused" or "ion exchanged" waveguides and waveguides in the form of a fiber. FIGS. 2-6 show illustrations of cross-sections of such embodiments depicted as waveguides 100, 200, 300, 400, and 500. In FIGS. 2 through 4, rare earth doped glass 102, 202, 302, 402 is adjacent to a lower low refractive index layer deposited on a silicon substrate 104, 204, 304, 404. Upper low refractive index layer 206, 306 is in contact with rare earth doped glass 202, 302 in some embodiments. In FIG. 6, rare earth doped glass core 502 is surrounded by low refractive index cladding 506. Examples of useful low refractive index materials for use in the optical waveguides of the invention include $SiO_2$, SiON, and glasses (un-doped) comprising for example, lanthanum, aluminum, and/or zirconium oxide. In some instances, it may be desirable to use an un-doped glass as described below, as the glass of an optical waveguide.

Figure 7:
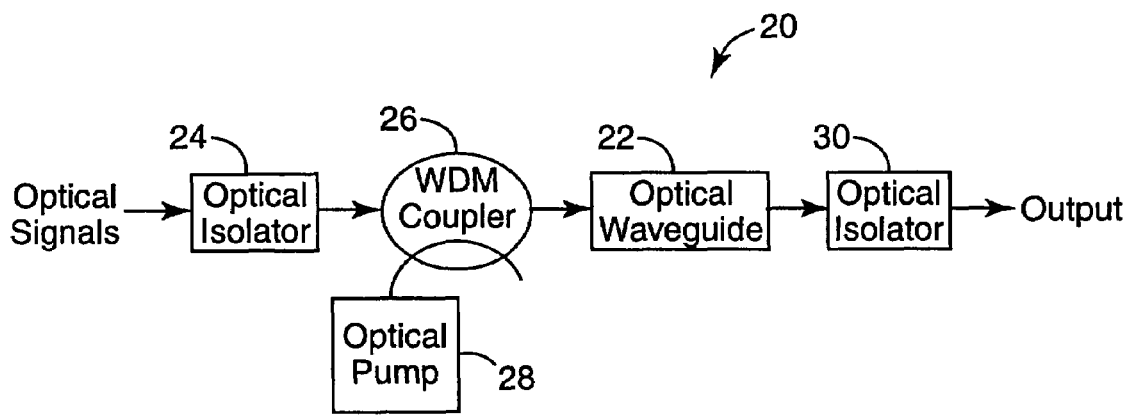
FIG. 7 is an illustration of one embodiment of an optical waveguide amplifier configuration of the invention.

FIG. 7 illustrates an exemplary standard waveguide amplifier configuration 20 containing an optical waveguide 22. Optical signals are input into the optical waveguide 22 via an optical isolator 24 and a waveguide division multiplexing (WDM) coupler 26. An optical pump signal from an optical pump source 28 is also input into the optical waveguide 22 via the WDM coupler 26. The amplified output signals from the optical waveguide 22 are output through a second optical isolator 30. The optical isolators 22, 30 are included to eliminate backward reflections from the optical waveguide 22 to the input port and from the output port, respectively. The above waveguide amplifier configuration is for illustrative purposes only. More detailed information regarding waveguide amplifiers may be found in U.S. Pat. No. 6,490,081 B1. The optical waveguides of the invention may be useful in any configuration used to amplify optical signals.

Glasses

The glasses used in the waveguides of the invention are used as a host material for the rare earth dopants. When a "rare earth dopant" and an "REO" are both present in a glass of the invention, the rare earth dopant and REO are different.

In some embodiments according to the present invention, the glass comprises $Al_2O_3$ and at least one of REO or $Y_2O_3$, wherein at least 80 (in some embodiments, at least 85, 90, 95, or even 100) percent by weight of the glass, respectively, collectively comprises the $Al_2O_3$ and the at least one of REO or $Y_2O_3$, based on the total weight of the glass, respectively.

In some embodiments according to the present invention, the glass comprises $Al_2O_3$, at least one of REO or $Y_2O_3$, and at least one of $ZrO_2$ or $HfO_2$, wherein at least 80 (in some embodiments, at least 85, 90, 95, or even 100) percent by weight of the glass, respectively, collectively comprises the $Al_2O_3$, at least one of REO or $Y_2O_3$, and at least one of $ZrO_2$ or $HfO_2$, based on the total weight of the glass, respectively.

In some embodiments according to the present invention, the glass comprises $Al_2O_3$ and at least one of REO or $Y_2O_3$, wherein at least 60 (in some embodiments, 65, 70, 75, 80, 85, 90, 95, or even at least 100) percent by weight of the glass, respectively, collectively comprises the $Al_2O_3$ and the at least one of REO or $Y_2O_3$, and wherein the glass, respectively, contains not more than 20 (in some embodiments, not more than 15, 10, 5, or even zero) percent by weight $SiO_2$ and not more than 20 (in some embodiments, not more than 15, 10, 5, or even zero) percent by weight $B_2O_3$, based on the total weight of the glass, respectively.

In some embodiments according to the present invention, the glass comprises $Al_2O_3$, at least one of REO or $Y_2O_3$, and at least one of $ZrO_2$ or $HfO_2$, wherein at least 60 (in some embodiments, 65, 70, 75, 80, 85, 90, 95, or even at least 100) percent by weight of the glass, respectively, collectively comprises the $Al_2O_3$, at least one of REO or $Y_2O_3$, and at least one of $ZrO_2$ or $HfO_2$, and wherein the glass, respectively, contains not more than 20 (in some embodiments, less than 15, 10, 5, or even zero) percent by weight $SiO_2$ and not more than 20 (in some embodiments, not more than 15, 10, 5, or even zero) percent by weight $B_2O_3$, based on the total weight of the glass, respectively.

In some embodiments according to the present invention, the glass comprises $Al_2O_3$ and at least one of REO or $Y_2O_3$, wherein at least 60 (in some embodiments, 65, 70, 75, 80, 85, 90, 95, or even at least 100) percent by weight of the glass, respectively, comprise the $Al_2O_3$ and the at least one of REO or $Y_2O_3$, and wherein the glass, respectively, contains not more than 40 (in some embodiments, not more than 35, 30, 25, 20, 15, 10, 5, or even zero) percent by weight collectively $SiO_2$, and $B_2O_3$, based on the total weight of the glass, respectively.

In some embodiments according to the present invention, the glass comprises $Al_2O_3$, at least one of REO or $Y_2O_3$, and at least one of $ZrO_2$ or $HfO_2$, wherein at least 60 (in some embodiments, 65, 70, 75, 80, 85, 90, 95, or even at least 100) percent by weight of the glass, respectively, collectively comprises the $Al_2O_3$, at least one of REO or $Y_2O_3$, and at least one of $ZrO_2$ or $HfO_2$, and wherein the glass, respectively, contains not more than 40 (in some embodiments, not more than 35, 30, 25, 20, 15, 10, 5, or even zero) percent by weight collectively $SiO_2$, and $B_2O_3$, and , based on the total weight of the glass, respectively.

In some embodiments according to the present invention, the glass comprises at least 35 (in some embodiments, at least 40, 45, 50, 55, 60, 65, 70, or even at least 75) percent by weight $Al_2O_3$, based on the total weight of the glass and a first metal oxide other than $Al_2O_3$ (e.g., $Y_2O_3$, REO, MgO, $TiO_2$, $Cr_2O_3$, CuO, NiO, and $Fe_2O_3$), and optionally, a second, (third, etc.) different metal oxide other than $Al_2O_3$ (e.g., $Y_2O_3$, REO, MgO, $TiO_2$, $Cr_2O_3$, CuO, NiO, and, $Fe_2O_3$), wherein the $Al_2O_3$, first metal oxide, and second metal oxide collectively comprise at least 80 (in some embodiments, at least 85, 90, 95, or 100) percent by weight of the glass, and wherein the glass contains not more than 20 (in some embodiments, not more than 15, 10, 5, 4, 3, 2, 1, or even zero) percent by weight collectively $B_2O_3$, $GeO_2$, $SiO_2$, $TeO_2$, and $V_2O_5$, based on the total weight of the glass, respectively.

The glasses and doped glasses can be made, for example, by heating (including in a flame) the appropriate metal oxide sources to form a melt, desirably a homogenous melt, and then rapidly cooling the melt to provide amorphous material. The metal oxide sources and other additives can be in any form suitable to the process and equipment used to make the glass. Desirable cooling rates include those of 10K/s and greater. Embodiments of amorphous materials can be made, for example, by melting the metal oxide sources in any suitable furnace (e.g., an inductive heated furnace, a gas-fired furnace, or an electrical furnace), or, for example, in a plasma. The resulting melt is cooled (e.g., discharging the melt into a cooling media (e.g., high velocity air jets, liquids, metal plates (including chilled metal plates), metal rolls (including chilled metal rolls), metal balls (including chilled metal balls), and the like)).

Further, other techniques for making melts and glasses include vapor phase quenching, melt-extraction, plasma spraying, and gas or centrifugal atomization. For additional details regarding plasma spraying, see, for example, copending application having U.S. application Ser. No.10/211,640, filed Aug. 2, 2002, the disclosure of which is incorporated herein by reference.

Gas atomization involves melting feed particles to convert them to melt. A thin stream of such melt is atomized through contact with a disruptive air jet (i.e., the stream is divided into fine droplets). The resulting substantially discrete, generally ellipsoidal amorphous material comprising particles (e.g., beads) are then recovered. Examples of bead sizes include those having a diameter in a range of about 5 micrometers to about 3 mm. Melt-extraction can be carried out, for example, as disclosed in U.S. Pat. No. 5,605,870, the disclosure of which is incorporated herein by reference. Containerless glass forming techniques utilizing laser beam heating as disclosed, for example, in U.S. Pat. No. 6,482,758, the disclosure of which is incorporated herein by reference, may also be useful in making glass.

Glasses can be made utilizing flame fusion as disclosed, for example, in U.S. Pat. No. 6,254,981, the disclosure of which is incorporated herein by reference. In this method, the metal oxide sources materials are fed (e.g., in the form of particles, sometimes referred to as "feed particles") directly into a burner (e.g., a methane-air burner, an acetylene-oxygen burner, a hydrogen-oxygen burner, and like), and then quenched, for example, in water, cooling oil, air, or the like. Feed particles can be formed, for example, by grinding, agglomerating (e.g., spray-drying), melting, or sintering the metal oxide sources. The size of feed particles fed into the flame generally determine the size of the resulting amorphous material comprising particles.

Embodiments of glasses can also be obtained by other techniques, such as: laser spin melt with free fall cooling, Taylor wire technique, plasmatron technique, hammer and anvil technique, centrifugal quenching, air gun splat cooling, single roller and twin roller quenching, roller-plate quenching and pendant drop melt extraction (see, e.g., *Rapid Solidification of Ceramics*, Brockway et. al, Metals And Ceramics Information Center, A Department of Defense Information Analysis Center, Columbus, Ohio, January, 1984, the disclosure of which is incorporated here as a reference). Embodiments of glasses may also be obtained by other techniques, such as: thermal (including flame or laser or plasma-assisted) pyrolysis of suitable precursors, physical vapor synthesis (PVS) of metal precursors, physical vapor deposition such as sputtering, (PVD), and mechanochemical processing.

The cooling rate is believed to affect the properties of the quenched amorphous material. For instance, glass transition temperature, density, and other properties of glass typically change with cooling rates.

Rapid cooling may also be conducted under controlled atmospheres, such as a reducing, neutral, or oxidizing environment to maintain and/or influence the desired oxidation states, etc. during cooling. The atmosphere can also influence amorphous material formation by influencing crystallization kinetics from undercooled liquid. For example, larger undercooling of $Al_2O_3$ melts without crystallization has been reported in argon atmosphere as compared to that in air.

Glasses can also be made by a sol-gel process. The sol-gel process comprises the steps of forming a precursor composition in the form of a dispersion, sol, or solution in an aqueous or organic liquid medium. Further details of these processes can be found in *Sol-Gel Science* by C. Jeffrey Brinker and George W. Scherer (Academic Press, 1990), the disclosure of which is incorporated herein by reference. Another method of making powders is by the spray pyrolysis of a precursor containing one or more glycolato polymetallooxanes dissolved in a volatile organic solvent; details about this process can be found in U.S. Pat. No. 5,958,361, the disclosure of which is incorporated herein by reference.

Sources, including commercial sources, of (on a theoretical oxide basis) $Al_2O_3$ include bauxite (including both natural occurring bauxite and synthetically produced bauxite), calcined bauxite, hydrated aluminas (e.g., boehmite and gibbsite), aluminum, Bayer process alumina, aluminum ore, gamma alumina, alpha alumina, aluminum salts, aluminum nitrates, and combinations thereof. The $Al_2O_3$ source may contain, or only provide, $Al_2O_3$. Alternatively, the $Al_2O_3$ source may contain, or provide $Al_2O_3$, as well as one or more metal oxides other than $Al_2O_3$ (including materials of or containing complex $Al_2O_3$-metal oxides (e.g., $Dy_3Al_5O_{12}$, $Y_3Al_5O_{12}$, $CeAl_{11}O_{18}$, etc.)).

Sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). Alternatively, the rare earth oxide(s) source may contain, or provide rare earth oxide(s), as well as one or more metal oxides other than rare earth oxide(s) (including materials of or containing complex rare earth oxides or other metal oxides (e.g., $Dy_3Al_5O_{12}$, $CeAl_{11}O_{18}$, etc.)).

Sources, including commercial sources, of (on a theoretical oxide basis) $Y_2O_3$ include yttrium oxide powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. Alternatively, the $Y_2O_3$ source may contain, or provide $Y_2O_3$, as well as one or more metal oxides other than $Y_2O_3$ (including materials of or containing complex $Y_2O_3$-metal oxides (e.g., $Y_3Al_5O_{12}$)).

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

Other useful metal oxides may also include, on a theoretical oxide basis, $BaO$, $CaO$, $Cr_2O_3$, $CoO$, $Fe_2O_3$, $GeO_2$, $Li_2O$, $MgO$, $MnO$, $NiO$, $Na_2O$, $Sc_2O_3$, $SiO_2$, $SnO_2$, $SrO$, $TiO_2$, $ZnO$, and combinations thereof. Sources, including commercial sources, include the oxides themselves, complex oxides, ores, carbonates, acetates, nitrates, chlorides, hydroxides, etc. These metal oxides are added to modify a physical property of the resulting glass and/or improve processing. These metal oxides are typically added anywhere from 0 to 50 percent by weight, in some embodiments preferably 0 to 25 percent by weight and more preferably 0 to 20 percent by weight of the glass depending, for example, upon the desired property.

Methods of Making Waveguide

The waveguides of the invention may be made generally by fabrication means known to one of ordinary skill in the art. For example, a channel waveguide (see FIG. 2) may be fabricated by depositing a doped glass layer on a low-index cladding, followed by standard or photo-lithography to define a line. The lithography is usually followed by the deposition of a low index top cladding. A ridge waveguide (see FIG. 3) is similar to a channel waveguide except that the doped glass layer is not fully etched back. A strip-loaded waveguide (see FIG. 4) may be made by placing a strip of low-index cladding on a planar layer of doped glass. A diffused waveguide (see FIG. 5) may be made by indiffusing a doped glass into the low-index substrate. The doped glasses may be deposited onto low index layers or cladding by known methods in the art such as sputtering and followed by photolithography to define lines or ridges. Alternatively, the doped glasses may be deposited onto low index layers or cladding by known methods in the art such as sputtering and then the doped glass layer may be covered by a low index layer (see FIG. 6). Glass fibers using the doped glasses described herein as the core of the fibers may be fabricated by well known methods, such as described in "Rare earth doped fiber lasers and amplifiers", Ed., M. J. F. Digonnet, 1993, Marcel Dekker, Inc. and in U.S. Pat. Nos. 6,484,539 B1 and 6,490,081 B1.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Comparative Examples A-E and Examples 1-18

A polyethylene bottle was charged with 100 grams (g) of the components indicated in Table 1. About 400 g of zirconia milling media (obtained from Tosoh Ceramics, Division of Bound, Brook, N.J., under the trade designation "YTZ") were added to the bottle along with 100 mL distilled and deionized water. The mixture was milled for 24 hours at 120 rpm. The sources of the raw materials used are listed in Table 2, below. Er source was introduced as $Er(NO_3).5H_2O$ (obtained from Aldrich Chemical Company, Milwaukee, Wis.) taking into account an oxide yield of approximately 43 wt. %. After the milling, the milling media were removed and the slurry was poured onto a glass ("PYREX") pan where it was dried using a heat-gun. Before melting in a flame, dried particles were calcined at 1300° C. for one hour in air in an electrically heated furnace (obtained under the trade designation "Model KKSK-666-3100" from Keith Furnaces of Pico Rivera, Calif.). Examples 1 and 2 were made in a procedure similar to that of Comparative Example A except that the starting components were milled in a Szegvari attrition mill (Union Process, Akron, Ohio) as an aqueous slurry at 65-70 percent by weight. Milling time was 2 hours at 50% power. Example 15 was annealed at 990° C. in air for one hour after bead formation.

After grinding with a mortar and pestle, some of the multiphase particles were fed into a hydrogen/oxygen torch flame. The hydrogen torch used to melt the multiphase particles, thereby generating a melted glass bead, was a Bethlehem bench burner (PM2D Model B obtained from Bethlehem Apparatus Co., Hellertown, Pa.). For the inner ring, the hydrogen flow rate was 8 standard liters per minute (SLPM), the oxygen flow rate was 3 SLPM. For the outer ring, the hydrogen flow rate was 23 SLPM, the oxygen flow rate was 9.8 SLPM. The dried and sized particles were fed directly into the hydrogen torch flame, where they were melted and transported to an inclined stainless steel surface (approximately 20 inches wide with the slope angle of 45 degrees) with cold water running over (approximately 2 gl/min).

The resulting molten and quenched particles were collected in a pan and dried at 110° C. The particles were spherical in shape and varied in size from a few tens of micrometers up to 250 micrometers. Subsequently, the particles were graded to retain the −140+230 mesh fractions (USA Standard Testing Sieves).

Example 8 was made by arc-melting as follows: A small quantity of dried powder was melted in an arc discharge furnace (Model No. 5T/A 39420; from Centorr Vacuum Industries, Nashua, N.H.). About 1 g of the dried powder was placed on the chilled copper plate located inside a furnace chamber. The furnace chamber was evacuated and then backfilled with Argon gas at 2 psi (13.8 kPa) pressure. An arc was struck between an electrode and a plate. The temperatures generated by the arc discharge were high enough to quickly melt the calcined flakes. After melting was complete, the material was maintained in a molten state for about 10 seconds to homogenize the melt. The resultant melt was rapidly cooled by shutting off the arc and allowing the melt to cool on its own. Rapid cooling was ensured by the small mass of the sample and the large heat sinking capability of the water chilled copper plate. The fused material was removed from the furnace within one minute after the power to the furnace was turned off. It is estimated that the cooling rate of the melt on the surface of the water chilled copper plate was above 100° C./sec. The fused material was in the form of transparent glass beads (largest diameter of a bead was measured at 2.8 mm).

TABLE 1

Starting Formulations for Beads

| Example | $La_2O_3$ (wt. %) | $Al_2O_3$ (wt. %) | $ZrO_2$ (wt. %) | $SiO_2$ (wt. %) | $TiO_2$ (wt. %) | SrO (wt. %) | $Er_2O_3$[a] (wt. %) |
|---|---|---|---|---|---|---|---|
| A | 49.98 | 21.99 |  | 29.77 |  |  | 0.05 |
| B | 49.75 | 21.89 |  | 27.86 |  |  | 0.50 |
| C | 49.60 | 21.82 |  | 27.78 |  |  | 0.80 |
| D | 49.50 | 21.78 |  | 27.72 |  |  | 1.00 |
| E | 49.00 | 21.56 |  | 27.44 |  |  | 2.00 |
| 1 | 35.90 | 40.98 | 18.12 |  |  |  | 5.00 |
| 2 | 39.20 | 44.10 | 16.60 |  |  |  | 0.10 |
| 3 | 31.50 | 35.40 | 13.30 |  |  | 19.70 | 0.10 |
| 4 | 41.56 | 37.89 | 18.33 |  |  |  | 2.20 |
| 5 | 41.22 | 37.59 | 18.18 |  |  |  | 3.00 |
| 6 | 40.88 | 37.28 | 18.04 |  |  |  | 3.80 |
| 7 | 40.58 | 37.00 | 17.90 |  |  |  | 4.50 |
| 8 | 40.58 | 37.00 | 17.90 |  |  |  | 4.50 |
| 9 | 42.28 | 38.73 | 18.74 |  |  |  | 0.05 |
| 10 | 42.45 | 38.72 | 18.73 |  |  |  | 0.10 |
| 11 | 42.41 | 38.68 | 18.71 |  |  |  | 0.20 |
| 12 | 42.30 | 38.55 | 18.65 |  |  |  | 0.50 |
| 13 | 42.16 | 38.44 | 18.60 |  |  |  | 0.80 |
| 14 | 42.08 | 38.36 | 18.56 |  |  |  | 1.00 |
| 15 | 42.08 | 38.36 | 18.56 |  |  |  | 1.00 |
| 16 | 81.60 | 17.40 |  |  |  |  | 1.00 |
| 17 |  | 72.27 |  |  | 26.73 |  | 1.00 |
| 18 | 42.00 | 38.30 | 18.53 |  |  |  | 1.17[b] |

[a]Er introduced as $Er(NO_3)_3 \cdot 5H_2O$. $Er_2O_3$ yield is 43 wt % $Er(NO_3)_3 \cdot 5H_2O$
[b]$ErF_3$ used as erbium source

TABLE 2

Raw Material Sources

| Raw Material | Source |
|---|---|
| Alumina ($Al_2O_3$) | Obtained from Condea Vista, Tucson, AR, under the trade designation "APA-0.5" |
| Erbium Nitrate Hexahydrate (($ErNO_3)_3 \cdot 5H_2O$) | Obtained from Aldrich Chemical Company, Milwaukee, WI |
| Erbium Fluoride ($ErF_3$) | Available from Aldrich Chemical Company |

TABLE 2-continued

Raw Material Sources

| Raw Material | Source |
|---|---|
| Lanthanum Oxide ($La_2O_3$) | Obtained from Molycorp Inc., Mountain Pass, CA |
| Silicon Dioxide ($SiO_2$) | Obtained from Alfa Aesar, Ward Hill, MA |
| Strontium Oxide (SrO) | Obtained from Aldrich Chemical Company, Milwaukee, WI |
| Titanium Dioxide ($TiO_2$) | Obtained from Sigma Chemicals, St. Louis, MO |
| Yttria-stabilized Zirconium Oxide ($ZrO_2$) | Obtained from Zirconia Sales, Inc., Marrietta, GA, under the trade designation "HSY-3" |

Photoluminescence

Photoluminescence data was obtained using a fiber pump/collection scheme. A bead of the composition being tested was suspended on the end of a first optical fiber mounted on an x-y-z translator. The translator was used to locate the bead within close proximity of the cleaved end of a second optical fiber oriented horizontally and with its axis perpendicular to the axis of the first fiber. A pump laser emitting light at a wavelength of approximately 980 nm was coupled to the other end of the second fiber via a wavelength-division multiplexer (WDM). Pump light exited the cleaved end of the second fiber and impinged on the bead. The fluorescence emitted by the bead was collected by the second fiber and directed toward the WDM. At the WDM, light in the wavelength range of 1450-1700 nm was directed toward an optical spectrum analyzer (OSA) for measurement. The mounting and initial alignment operation was viewed under an optical microscope and the bead position was optimized for maximum fluorescence (as monitored on the OSA). The fluorescence data recorded on the OSA was analyzed for the peak wavelength and the breadth of the peak as measured by the full-width half-maximum (FWHM). The fluorescence data given is from the average of three beads of similar composition.

The excited state lifetime was determined from analysis of emission decay curves. The 1450-1700 nm light from the WDM was directed to a fast photodiode connected to a digitizing oscilloscope. An external signal generator was used to drive the pump laser with a square pulse of about 25 milliseconds (ms) duration at a repetition rate of about 10 Hz. After averaging 10 to 128 measurements on the oscilloscope, the data was transferred to a computer for analysis. The reported lifetime is the lie lifetime, defined as the time from the end of the pump pulse to the time when the fluorescence signal decreases to 36.8% (1/e) of its peak value. The lifetime value given is from the average of three beads of similar composition.

Table 3 displays the photoluminescence data for all of the samples. $L_{peak}$ is the peak wavelength (nm) of the emission energy from the beads, FWHM is the full-width at half-maximum of the peak, and Lifetime is the excited state lifetime determined from analysis of the emission decay curves.

TABLE 3

Photoluminescence Data of Er-doped Beads

| Example | $L_{peak}$ (nm) | FWHM (nm) | Lifetime (ms) |
|---|---|---|---|
| A | 1532.8 | 41.25 | 4.6 |
| B | 1532.8 | 42.19 | 3.4 |
| C | 1532.8 | 40.31 | 2.4 |
| D | 1533.8 | 40.31 | 2.3 |
| E | 1532.8 | 40.94 | |
| 1 | 1532.5 | 45.94 | 0.7 |
| 2 | 1532.6 | 42.30 | 4.2 |
| 3 | 1531.9 | 49.56 | 3.1 |
| 4 | 1532.8 | 44.38 | 1.8 |
| 5 | 1533.1 | 44.69 | 1.3 |
| 6 | 1533.4 | 47.50 | 1.2 |
| 7 | 1532.9 | 47.19 | 0.9 |
| 8 | 1532.8 | 47.81 | 1.3 |
| 9 | 1532.5 | 35.00 | 4.7 |
| 10 | 1532.5 | 35.94 | 4.5 |
| 11 | 1532.2 | 35.94 | 4.6 |
| 12 | 1532.5 | 44.06 | 4.3 |
| 13 | 1532.5 | 43.33 | 4.6 |
| 14 | 1532.5 | 43.13 | 3.4 |
| 15 | 1532.2 | 60.00 | 3.8 |
| 16 | 1535.3 | 30.31 | 1.2 |
| 17 | 1530.3 | 55.31 | 2.3 |
| 18 | 1532.5 | 41.56 | 2.8 |

Example 19

Waveguide Amplifier

A polyurethane-lined jar was charged with 267.6 g of $La_2O_3$, 207.78 g of $Al_2O_3$, 118.56 g of $ZrO_2$, and 13.92 g $Er(NO_3)_3 \cdot 5H_2O$. (The sources of the raw materials used are listed in Table 2). About 1000 g of zirconia milling media (obtained from Tosoh Ceramics, Division of Bound, Brook, N.J., under the trade designation "YTZ") were added to the jar along with 600 mL distilled and deionized water. The mixture was milled for 24 hours at 120 rpm. After the milling, the milling media were removed and the slurry was poured onto a glass ("PYREX") pan where it was dried using a heat-gun. Before melting in a flame, dried particles were calcined at 1300° C. for one hour in air in an electrically heated furnace (obtained under the trade designation "Model KKSK-666-3100" from Keith Furnaces, Pico Rivera, Calif.).

Example 9 spherical particles were prepared as described in Examples 1-18.

An RF sputter target was made by plasma spraying the spherical particles onto a stainless steel backing (plasma-spray services available at Precision Coatings, Inc., St. Paul, Minn.) that was machined to fit into a Sputtered Films, Inc. Research S-Gun, turbo-pumped sputter system. Plasma-spraying produced a film of target material with an approximate thickness of 1.1 mm as determined using optical microscopy.

The RF sputtering chamber has a planetary set-up that allows up to 6 wafers to be coated in the same batch. The 13.56 MHz RF power supply output goes to a power splitter that divides the power between the target and the planetary system to allow substrates to be biased. Both electrodes have a dedicated RF matching network. The plasma sprayed target material was deposited at a pressure of 0.23 Pa (1.7 mTorr) at a target power of 850 Watts. Argon and oxygen were used as sputtering gases at flow rates of 25 standard cubic centimeters per minute (sccm) and 5 sccm, respectively. The planetary system was biased at a power of approximately 40 Watts to aid in the densification of the deposited film.

A 0.9 micrometer thick film of target material was sputtered on to a patterned 3 inch diameter silicon wafer. This wafer had an 8 micrometer thick $SiO_2$ cladding layer deposited directly on the silicon surface using a PECVD process. A positive photoresist (Shipley S1818, available from the Shipley Company, Marlborough, Mass.) was patterned on top of the $SiO_2$ cladding. This pattern had the negative image of waveguide ridges in various widths ranging from 2 to 100 micrometer. An undercut of 0.4 micrometer was made in the exposed $SiO_2$ cladding by wet etching in buffered hydrofluoric acid (1:6 $HF:NH_4F$) for 6.5 minutes to help facilitate lift-off of the photoresist after deposition of Example 19 material.

After deposition, the wafer was soaked in an ultrasonic bath containing photoresist remover (Shipley 1165) at approximately 50° C. The photoresist was lifted off the wafer taking target material directly on top of it with, thereby leaving a waveguide ridge of doped glass where the photoresist patterning had left channels before deposition.

What is claimed is:

1. An optical waveguide comprising:
   a substrate; and
   a glass doped with a rare earth dopant deposit on and affixed to a surface of the substrate, wherein the glass comprises:
   (a) $Al_2O_3$, at least one of rare earth oxide (REO) or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, based on the total weight of the glass; or
   (b) $Al_2O_3$, at least one of REO or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, and wherein the glass contains not more than 20 percent by weight $SiO_2$ and not more than 20 percent by weight $B_2O_3$, based on the total weight of the glass, wherein the rare earth dopant is a different material than REO and the rare earth dopant is selected from the group consisting of cerium, praseodymium, neodymium, promethium, samarium, europium, gadolinium, terbium, dysprosium, holmium, erbium, thulium, ytterbium, or their other compounds and mixtures thereof.

2. The optical waveguide according to claim 1 wherein the rare earth dopant comprises erbium.

3. The optical waveguide according to claim 1 wherein REO comprises $La_2O_3$.

4. The optical waveguide according to claim 1 wherein the substrate comprises silicon or $SiO_2$.

5. An optical waveguide comprising:
   a glass fiber having a core material and a cladding surrounding the core material, wherein the core material comprises:
   a glass doped with a rare earth dopant, wherein the glass comprises:
   (a) $Al_2O_3$, at least one of REO or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, based on the total weight of the glass; or
   (b) $Al_2O_3$, at least one of REO or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, and wherein the glass contains not more than 20 percent by weight $SiO_2$ and not more than 20 percent by weight $B_2O_3$, based on the total weight of the glass, wherein the rare earth dopant is a different material than REO and the earth dopant is selected from the group consisting of cerium, praseodymium, neodymium, promethium, samarium, europium, gadolinium, terbium, dysprosium, holmium, erbium, thulium, ytterbium, or their other compounds and mixtures thereof.

6. The optical waveguide according to claim 5 wherein the rare earth dopant comprises erbium.

7. The optical waveguide according to claim 5 wherein REO comprises $La_2O_3$.

8. The optical waveguide according to claim 5 wherein the cladding layer comprises $SiO_2$.

9. An optical amplifier comprising:
   an optical pump source which provides optical pump light; and
   an optical waveguide coupled to receive said optical pump light from the optical pump source, wherein said optical waveguide comprises a glass doped with a rare earth dopant, wherein the glass comprise:
   (a) $Al_2O_3$, at least one of REO or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, based on the total weight of the glass; or
   (b) $Al_2O_3$, at least one of REO or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, and wherein the glass contains not more than 20 percent by weight $SiO_2$ and not more than 20 percent by weight $B_2O_3$, based on the total weight of the glass, wherein the rare earth dopant is a different material than REO and the rare earth dopant is selected from group consisting of cerium, praseodymium, neodymium, promethium, samarium, europium, gadolinium, terbium, dysprosium, holmium, erbium, thulium, ytterbium, or their other compounds and mixtures thereof.

10. The optical amplifier according to claim 9 wherein the rare earth dopant comprises erbium.

11. The optical amplifier according to claim 9 wherein REO comprises $La_2O_3$.

12. A glass useful in optical waveguides comprising:
   a glass doped with a rare earth dopant wherein the glass comprises:
   (a) $Al_2O_3$, at least one of REO or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, based on the total weight of the glass; or
   (b) $Al_2O_3$, at least one of REO or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, and wherein the glass contains not more than 20 percent by weight $SiO_2$ and not more than 20 percent by weight $B_2O_3$, based on the total weight of the glass, wherein the rare earth dopant is a different material than REO and the rare earth dopant is selected from group consisting of praseodymium, promethium, samarium, europium, gadolinium, terbium, dysprosium, holmium, erbium, thulium, ytterbium, compounds and mixtures thereof.

13. The glass according to claim 12 wherein the rare earth dopant comprises erbium.

14. The glass according to claim 12 wherein REO comprises $La_2O_3$.

15. The glass according to claim 12 wherein the glass comprises
   (a) $Al_2O_3$, at least one of REO or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, based on the total weight of the glass; or
   (b) $Al_2O_3$, at least one of REO or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, and wherein the glass contains not more than 20 percent by weight $SiO_2$ and not more than 20 percent by weight $B_2O_3$, based on the total weight of the glass; and
   (c) a metal oxide other than $Al_2O_3$, REO, $ZrO_2$ or $HfO_2$.

16. The glass according to claim 15 wherein the other metal oxide comprises $TiO_2$.

17. A method for amplifying optical signals comprising the steps of:
   (1) inputting the optical signals to an optical waveguide comprising a glass doped with a rare earth dopant, wherein the glass comprises:
   (a) $Al_2O_3$, at least one of REO or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, based on the total weight of the glass; or
   (b) $Al_2O_3$, at least one of REO or $Y_2O_3$, and at least one of $ZrO_2$ or $HfO_2$, wherein at least 80 percent by weight of the glass collectively comprises the $Al_2O_3$, at least one of REO or $Y_2O_3$, and at least one of $ZrO_2$ or $HfO_2$, and wherein the glass contains not more than 20 percent by weight $SiO_2$ and not more than 20 percent by weight $B_2O_3$, based on the total weight of the glass, wherein the rare earth dopant is a different material than REO and the rare earth dopant is selected from the group consisting of cerium, praseodymium, neodymium, promethium, samarium, europium, gadolinium, terbium, dysprosium, holmium, erbium, thulium, ytterbium, or their other compounds and mixtures thereof; and
   (2) applying pump light to said optical waveguide to cause said waveguide to provide optical gain to the optical input signals.

18. The optical waveguide according to claim 1 wherein the substance is a lower low refractive index layer and further comprises an upper low refractive index layer.

* * * * *

UNITED STATES PATENT AND TRADEMARK OFFICE
CERTIFICATE OF CORRECTION

PATENT NO. : 7,292,766 B2
APPLICATION NO. : 10/425039
DATED : November 6, 2007
INVENTOR(S) : Mark T. Anderson It is certified that error appears in the above-identified patent and that said Letters Patent is hereby corrected as shown below:

Col. 9
Line 53, delete "Er2O3" and insert -- $Er_2O_3$ --, therefor.

Col. 10
Line 56, delete "lie" and insert -- 1/e --, therefor.

Col. 11
Line 48, delete "9" and insert -- 19 --, therefor.

Col. 12
Line 26, in Claim 1, delete "deposit" and insert -- deposited --, therefor.

Col. 13
Line 6, in Claim 5, before "earth" insert -- rare --.
Line 23, in Claim 9, delete "comprise:" and insert -- comprises: --, therefor.
Line 37, in Claim 9, after "from" insert -- the --.

Col. 14
Line 1, in Claim 12, after "than" insert -- the --.
Line 2, in Claim 12, after "from" insert -- the --.
Line 57, in Claim 18, delete "substance" and insert -- substrate --, therefor.
Line 58, in Claim 18, delete "refactive" and insert -- refractive --, therefor.

Signed and Sealed this

Eighth Day of April, 2008

JON W. DUDAS
*Director of the United States Patent and Trademark Office*